Figure 1:
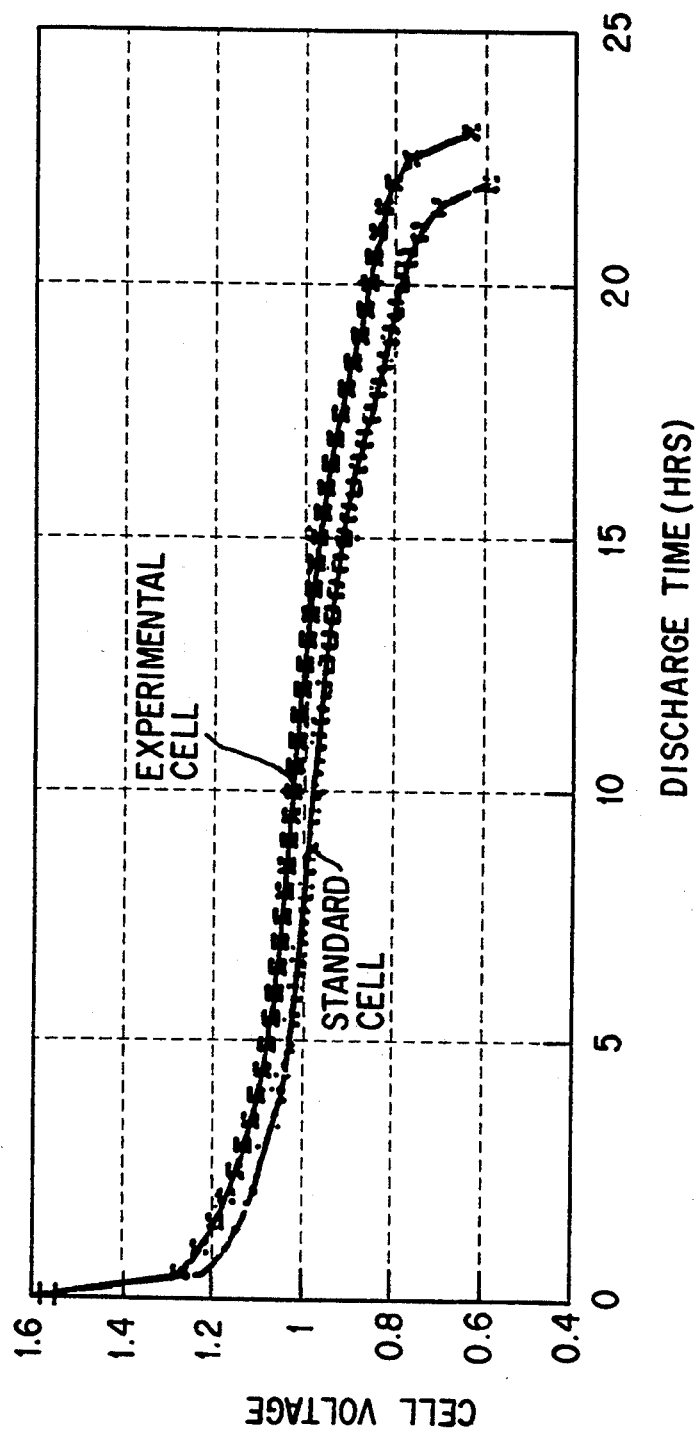

United States Patent [19]

Mieczkowska et al.

[11] Patent Number: 5,342,712
[45] Date of Patent: Aug. 30, 1994

[54] ADDITIVES FOR PRIMARY ELECTROCHEMICAL CELLS HAVING MANGANESE DIOXIDE CATHODES

[75] Inventors: Jola E. Mieczkowska, Crawley; Simon P. Markfort, West Sussex, both of England

[73] Assignee: Duracell Inc., Bethel, Conn.

[21] Appl. No.: 61,976

[22] Filed: May 17, 1993

[51] Int. Cl.$^5$ .............................................. H01M 4/62
[52] U.S. Cl. ...................................... 429/224; 429/232
[58] Field of Search .............................. 429/224, 232

[56] References Cited

U.S. PATENT DOCUMENTS

| | | | |
|---|---|---|---|
| 1,058,778 | 4/1913 | Morrison | 429/232 |
| 4,096,318 | 6/1978 | Wurmb et al. | 429/224 X |
| 4,483,785 | 11/1984 | Johnson et al. | 252/520 |
| 4,524,091 | 6/1985 | Blaauw et al. | 429/111 X |
| 5,011,752 | 4/1991 | Kordesch | 429/206 |
| 5,026,617 | 6/1991 | Kosaka | 429/206 |

FOREIGN PATENT DOCUMENTS 3337568 4/1985 Fed. Rep. of Germany.
64-6384 1/1989 Japan.

Primary Examiner—Stephen Kalafut
Attorney, Agent, or Firm—Ronald S. Cornell; Edward M. Corcoran; Barry D. Josephs

[57] ABSTRACT

The invention relates to primary alkaline cells containing manganese dioxide cathode active material. Anatase titanium dioxide is added to the manganese dioxide cathode material resulting in an increase in the useful service life of the cell. Typically the anatase titanium dioxide comprises between 0.1 and 5 percent by weight of the cathode active material.

13 Claims, 1 Drawing Sheet

ADDITIVES FOR PRIMARY ELECTROCHEMICAL CELLS HAVING MANGANESE DIOXIDE CATHODES

The invention relates to primary alkaline electrochemical cells with manganese dioxide cathode active material and anatase titanium dioxide added to the cathode material to extend the useful service life of the cell.

Primary alkaline cells typically contain zinc anode active material, alkaline electrolyte, a manganese dioxide cathode active material, and an electrolyte permeable separator film, typically of cellulose. The anode active material comprises zinc particles admixed with conventional gelling agents, such as carboxymethylcellulose or acrylic acid copolymers, and electrolyte. The gelling agent holds the zinc particles in place and in contact with each other. A conductive metal nail, known as the anode current collector, is typically inserted into the anode active material. The alkaline electrolyte is typically an aqueous solution of potassium hydroxide, but other alkali solutions of sodium or lithium hydroxide may also be employed. The cathode material is typically of manganese dioxide and may include small amounts of carbon or graphite to increase conductivity. Conventional alkaline cells are encased in a steel container to retain the cell components and reduce the chance of leakage.

It has been known to add $TiO_2$ to cathodes in rechargeable cells for the purpose of improving rechargeability. See for example Japanese Kokai patent SHO 64-6384; German patent No. DE 3337568; and U.S. Pat. No. 5,011,752. However, neither reference teaches that the capacity of a primary cell can be increased by addition of $TiO_2$. It is also known to add $TiO_2$ to a cell separator as discussed in U.S. Pat. No. 5,026,617.

Since commercial cell sizes are fixed it has been desirable to attempt to increase the capacity, i.e., the useful service life of the cell by increasing the surface area of the electrode active material and by packing greater amounts of the active material into the cell. This approach has practical limitations, since if the active material is packed too densely into the cell this can reduce the rate of electrochemical reaction during discharge, in turn reducing service life. Other deleterious effects such as polarization can occur, particularly at high current drain rates. Polarization limits the mobility of ions within the electrode active material and within the electrolyte, which in turn reduces service life. Thus, it is desirable to provide a way of reliably increasing the useful service life of conventional primary alkaline cells, including zero-added mercury cells, without noticeably increasing polarization effects or otherwise adversely affecting cell performance.

Accordingly it is desirable to find an additive for primary alkaline cells which extend the useful service life of the cell.

It is desirable to find an additive which extends the useful service life of primary alkaline cells having manganese dioxide cathode active material and "zero-added" amounts of mercury.

The following FIGURE depicts the improved performance of a primary cell incorporating the additive of the invention.

FIG. 1 is a graphical plot of Cell Voltage vs. Discharge Time comparing the performance of a standard $Zn/MnO_2$ primary alkaline cell with the same cell containing added amounts of anatase $TiO_2$ to the cathode active material.

It has been discovered that the addition of small amounts of the anatase crystal structure of $TiO_2$ to the cathode active material of conventional primary zinc/$MnO_2$ alkaline cells increases the discharge capacity of such cells at high and medium drain rates. The improvement is most applicable to AA, C and D size primary zinc/alkaline cells, but can be realized as well in AAA cells. The amount of anatase titanium dioxide which may be added is preferably between about 0.1 and 5 percent by weight of the total cathode active material. For C and D size primary zinc/alkaline cells the anatase titanium dioxide typically comprises between about 1 and 5 wt % of the total cathode active material. When anatase $TiO_2$ is added to the cathode of a "C" or "D" size cell, a 10 to 15% improvement in service life is realized at high drain rates (discharge at 2 to 4 ohms down to an 0.8 volt cut-off voltage) and an 8 to 13% improvement in service life at medium drain rates (discharge at 4 to 7 ohms down to a 0.9 volt cutoff voltage).

When the anatase $TiO_2$ is added to the cathode active material in AA size cell, a 5% improvement in useful service life is typically obtained at high drain rates (3.9 ohm load) and a 4% improvement is obtained at medium drain rates (10 ohm load).

The above stated improvements in service life are particularly applicable to conventional zinc/$MnO_2$ alkaline cells containing "zero amounts" of added mercury. Zero-added mercury cells contain no added amounts of mercury, but may contain only the residual amount of mercury present in commercially available pure zinc, including the residual amount of mercury, if any, present in the other cell components. The total mercury content in such cells is less than 50 parts mercury per million parts total cell weight, typically less than 10 parts mercury per million parts total cell weight. The improvement in service life is not obtainable with the rutile form of titanium dioxide.

It is not known with certainty why the improvement in useful service life occurs. However, it is believed that the addition of small amount of anatase $TiO_2$ to the cathode active material increases the mobility of ionic flow during discharge. This can decrease polarization effects and result in increased service life. The increase in service life is particularly surprising, since such increase may be obtained by adding $TiO_2$ to the cell at the expense of removing an equal amount of active $MnO_2$ material.

The zinc/$MnO_2$ cells to which the present invention is applicable are conventional primary alkaline cells which are manufactured in conventional manner employing a zinc anode active material, $MnO_2$ cathode active material and potassium hydroxide electrolyte. It is preferred that the zinc anode has no "added mercury". However, the present invention is also applicable to zinc/$MnO_2$ primary alkaline cells containing mercury. All the components in the cell including the anode active material, electrolyte and separator are composed of materials conventionally employed in such cells. The composition of the cathode active material is also conventional except that anatase titanium dioxide is added to the cathode material. These cells are typically configured as in U.S. Pat. No. 4,740,435 wherein the anode active material forms the central core of the cell and the cathode active material is located around the anode material with the separator therebetween. The cathode material contacts the inside surface of the cell casing which is typically of stainless steel.

The cathode active material is prepared at room temperature by adding anatase $TiO_2$, electrolytic $MnO_2$, and graphite to a mechanical electrical mixer. The ingredients are mixed for a short period, e.g. less than one half hour, whereupon 7 Normal KOH is added over a period of several minutes to produce a mixed wet powder. The mix is then used to form annularly shaped pellets. These pellets are sized in height so that about four can be packed into a steel cell casing to form the cathode active material. The cavity of the annular cathode structure is lined with an appropriate separator and the anode material is placed therein.

The following examples illustrate the invention and advantages derived therefrom. (All compositions are by weight unless otherwise specified.)

EXAMPLE 1

Comparative Example

A primary zinc/manganese dioxide alkaline size D cell, as above referenced, is prepared with conventional cathode and anode active material, electrolyte and separator membrane. The anode material may be in the form of a gelled mixture containing mercury free (zero-added mercury) zinc alloy powder. Such mixture may typically contain aqueous KOH solution, gelling agent, e.g. acrylic acid copolymer such as CARBOPOL C934 from B. F. Goodrich; and surfactants e.g. organic phosphate ester surfactant GAFAC RA600 from Rhone Poulenc. Specific formulations of representative zinc slurries are disclosed in European Patent Publication 0474382A1. The separator membrane can be a conventional electrolyte permeable membrane of polyvinyl alcohol/rayon material. The electrolyte is an aqueous solution of KOH containing about 40 wt % KOH and 2 wt % ZnO, hereinafter referred to as "aqueous KOH solution". The cathode active material in the cell has the following composition:

Electrolytic manganese dioxide (84 wt %), graphite (9.5 wt %), and a 7 Normal "aqueous KOH solution" (6.5 wt %).

The cell is discharged at a constant high current drain rate of 410 milliamps which is equivalent to about a 2.2 ohm load. The voltage versus time discharge profile for this cell is presented in FIG. 1. The useful service life of the cell as measured by the time for the cell voltage to drop to 0.8 volts from its initial voltage of 1.5 volts, is 20 hours.

EXAMPLE 2

An experimental zinc/$MnO_2$ size D alkaline cell identical to that referenced in example 1 is prepared, except that in making the experimental cell an amount (gms) of anatase $TiO_2$ is added so that the total cathode material comprises 4.2 percent by weight anatase $TiO_2$. The amount of $MnO_2$ in the cathode is reduced by an equal amount (gms) so that the total cathode weight in the experimental cell is the same as in the standard cell of Example 1. The cell is discharged at a constant high drain of 410 milliamps (equivalent to a load of about 2.2 ohms) during the life of the cell. The voltage vs. time discharge profile for this cell is plotted in FIG. 1 next to the profile obtained at same drain rate using the standard cell described in Example 1. It may be seen that the useful service life (determined at a cut off voltage of 0.8 volts) of the experimental cell is 23 hours, which is about 15% longer than the useful service life of the standard cell. The experimental cell running voltage is about 60 millivolts higher than the standard cell throughout discharge.

EXAMPLE 3

Comparison performance tests are made with different amounts of anatase $TiO_2$ additive and at different current drain rates. In a first group of experimental tests the performance of size D zinc/$MnO_2$ alkaline cells are compared for sets of cells at three different drain rates (high, medium and low) and at two different levels of amount of anatase $TiO_2$ added to the cathode active material. The performance results in each set of experimental cells are reported and compared to a standard cell containing no added anatase $TiO_2$ and discharged at the same drain rate. The composition of the standard cell is as set forth in Example 1.

The composition of each experimental cell tested in the current example is the same as the standard cell, except that various amounts of anatase $TiO_2$ have been added to the cathode to yield the specified percent by weight $TiO_2$ in the cathode material as reported in Table 1. Accordingly, the amount (gms) of $MnO_2$ in the cell is reduced by an equal amount of $TiO_2$ added so that the total cathode weight in each case remains the same. The performance tests are carried out at both continuous and intermittent discharge regimens. In the latter case the cells are discharged for 1 hour per day every day until the useful service life cut-off voltage has been reached.

As the cell is discharged the voltage eventually falls to a point where the cell is no longer useful for the intended service. The cut-off voltages used in determining useful service life are 0.8 volts for high drain rate; 0.9 volts for medium drain rate; and 0.9 volts for low drain rate. The drain rates, amount of anatase $TiO_2$ additive and voltage cut-off used to determine the useful service life for each set of cells is summarized in Table 1. The performance results are reported as a percent gain (+) or loss (−) in useful service hours for each set of cells as compared to that obtained with the standard cell. For example, a 10% gain for a set of cells at a given drain rate and amount of anatase $TiO_2$ additive, indicates that 10% more service hours are attained for those cells as compared to the standard cell containing no added anatase $TiO_2$. The comparisons for each set of cells is based on an average of results from 10 to 20 identical cells.

TABLE 1

| Group | Test | % $TiO_2$ In Cathode | % Increase In Service Life | |
|---|---|---|---|---|
| | | | Continuous | Intermittent |
| I | High Rate | 2.5 | +13 | +10 |
| | (2.2 Ohms) | 5.0 | +15 | +7 |
| II | Medium Rate | 2.5 | +8 | +11 |
| | (3.9 Ohms) | 5.0 | +8 | +7 |
| III | Low Rate | 2.5 | −2 | |
| | (39 Ohms) | 5.0 | −15 | |

The results presented in Table 1 indicate that very good performance gains in service life are obtained at high (2.2 ohm load) and medium (3.9 ohm load) drain rates. The average gains at high and medium drain rates of the cells tested are about 14 and 8 percent, respectively, at continuous discharge and about 8 and 9 percent, respectively, at intermittent discharge. These gains are obtained at levels of anatase $TiO_2$ between about 2 and 5 wt % of the total cathode active material. Service life at low drain rates is reduced. However, the reduction is very small (about 2%) when the amount of anatase $TiO_2$ is about 2 wt % of the cathode material.

EXAMPLE 4

Another group of comparison performance test are made similar to those of Example 3 except that C size zinc/$MnO_2$ alkaline cells are used. The experimental "C" cells are made by reducing the amount of $MnO_2$ from a standard "C" cell (composition similar to that employed in Example 1) by various amounts and replacing the reduced amount with an equal amount of anatase $TiO_2$. As in Example 3 the performance of sets of experimental cells at different drain rates (high, medium and low) are determined at different levels of anatase $TiO_2$ added to the cathode material. The performance results in each set of cells is reported in Table 2 as a percent gain (+) or loss (−) in useful service hours as compared to a standard cell containing no added anatase $TiO_2$ and discharged at the same drain rate. As in Example 3 the tests are conducted at both continuous and intermittent discharge regimens (defined above). The discharge cutoff voltage used to determine the useful service life for each set of cells at high, medium, and low drain rates is the same as given in Example 3.

TABLE 2

| Group | Test | % $TiO_2$ In Cathode | % Increase In Service Life | |
|---|---|---|---|---|
| | | | Continuous | Intermittent |
| I | High Rate | 1.25 | +11 | +12 |
| | (3.9 Ohms) | 2.5 | +12 | +15 |
| | | 5.0 | +7 | +7 |
| II | Medium Rate | 1.25 | +9 | +12 |
| | (6.8 Ohms) | 2.5 | +10 | +12 |
| | | 5.0 | +5 | +13 |
| III | Low Rate | 1.25 | −4 | |
| | (37 Ohms) | 2.5 | −4 | |
| | | 5.0 | −5 | |

The results presented in Table 2 indicate that very good improvement in service life is attained at high (3.9 ohm load) and medium (6.8 ohm load) drain rates. However, the improvement is greatest at both high and medium drain rates at the lower amounts of anatase $TiO_2$ between about 1.25 and 2.5 wt % of the total cathode material. The gains at high and medium drain rates average about 10 and 8 percent, respectively, at continuous discharge, and about 11 and 12 percent, respectively, at intermittent discharge. These average gains are obtained at levels of anatase $TiO_2$ between about 1 and 5 wt % of the total cathode material. The average gains for added amounts of anatase $TiO_2$ between about 1.25 and 2.5 wt % of the cathode are 12 and 10 percent for high and medium continuous discharge, respectively, and between about 14 and 12 percent for high and medium intermittent discharge, respectively. Service life at low drain rates is reduced. However, the reduction is small (about 4%) when the amount of anatase $TiO_2$ is about 1 to 2 wt % of the cathode material.

Based on the results of the performance tests presented in the tables, the optimum amount of anatase $TiO_2$ to be added to the cathode material in C and D size cells is about 2 wt % of the total cathode material.

Similar tests are performed on AA size zinc/$MnO_2$ alkaline cells. The best performance improvements attained are at low amounts of added anatase $TiO_2$ of less than about 1 wt % of the cathode material. Specifically, with anatase $TiO_2$ comprising about 0.6 wt % of the cathode material, a 5 percent improvement in useful service life is obtained on average at high drain rates (3.9 ohm load) and a 4 percent improvement is obtained at medium drain rates (10 ohm load), both at continuous discharge. Improvements in service life can also be obtained by adding anatase $TiO_2$ to the cathode material in AAA size cells.

The increase in service life reported in Example 2 and Tables 1 and 2 are conservative. Since there is less $MnO_2$ in the experimental cells than in the corresponding size standard cell, the percent increase in service life on a per gram $MnO_2$ basis would be higher than on the per cell basis reported in Example 2 and the tables.

Although the present invention was described with respect to specific embodiments, it should be recognized that variations are possible without departing from the concept of the invention. Thus, the invention is not intended to be limited to the specific embodiments, but rather its scope is reflected by the claims and equivalents thereof.

What is claimed is:

1. A primary electrochemical cell comprising an anode active material, an aqueous alkaline electrolyte solution, a separator and a cathode comprising manganese dioxide, said cathode further comprising anatase titanium dioxide.

2. The cell of claim 1 wherein the anode active material comprises zinc.

3. The cell of claim 1 wherein the aqueous electrolyte solution comprises potassium hydroxide.

4. The cell of claim 1 wherein the cathode comprises between 0.1 and 5 percent by weight anatase titanium dioxide.

5. The cell of claim 1 wherein the total mercury content in the cell is less than 50 parts per million parts of total cell weight.

6. The cell of claim 1 wherein the total mercury content in the cell is less than 10 parts per million parts of total cell weight.

7. The cell of claim 1 wherein the cell is selected from the group consisting of AAA, AA, C and D size cells.

8. The cell of claim 1 wherein the cell is selected from the group consisting of C and D size cells and the cathode comprises between about 0.1 and 5 percent by weight anatase titanium dioxide.

9. A primary electrochemical cell comprising an anode active material, an aqueous alkaline electrolyte solution, a separator and a cathode comprising manganese dioxide, said cathode further comprising between 0.1 and 5 percent by weight anatase titanium dioxide.

10. The cell of claim 9 wherein said cell comprises less than 50 parts mercury per million parts total cell weight.

11. The cell of claim 9 wherein the cell is selected from the group consisting of AAA, AA, C, and D size cells.

12. The cell of claim 9 wherein the cell is selected from the group consisting of C and D size cells and the cathode comprises between about 0.1 and 5 percent by weight anatase titanium dioxide.

13. A primary electrochemical cell comprising an anode active material, an aqueous alkaline electrolyte solution, a separator and a cathode comprising manganese dioxide, said cathode further comprising between about 0.1 and 5 percent by weight anatase titanium dioxide and said cell comprising less than 50 parts mercury per million parts total cell weight.

* * * * *